United States Patent
Miyata et al.

(10) Patent No.: US 10,337,447 B2
(45) Date of Patent: Jul. 2, 2019

(54) FUEL INJECTION CONTROL APPARATUS OF INTERNAL COMBUSTION ENGINE

(71) Applicant: MITSUBISHI JIDOSHA KOGYO KABUSHIKI KAISHA, Tokyo (JP)

(72) Inventors: Toshiyuki Miyata, Okazaki (JP); Hitoshi Toda, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 109 days.

(21) Appl. No.: 14/801,492

(22) Filed: Jul. 16, 2015

(65) Prior Publication Data
US 2016/0017818 A1   Jan. 21, 2016

(30) Foreign Application Priority Data

Jul. 17, 2014  (JP) ................. 2014-147124

(51) Int. Cl.
| | |
|---|---|
| *F02D 41/40* | (2006.01) |
| *F02D 41/10* | (2006.01) |
| *F02D 41/30* | (2006.01) |
| *F01N 3/10* | (2006.01) |
| *F02D 41/24* | (2006.01) |

(52) U.S. Cl.
CPC ........... *F02D 41/402* (2013.01); *F02D 41/10* (2013.01); *F02D 41/3094* (2013.01); *F02D 41/401* (2013.01); *F01N 3/101* (2013.01); *F02D 41/247* (2013.01); *Y02T 10/22* (2013.01); *Y02T 10/44* (2013.01)

(58) Field of Classification Search
CPC ...... F02D 41/402; F02D 41/10; F02D 41/401; F02D 41/3094; F02D 41/247; Y02T 10/22; Y02T 10/44; F01N 3/101
See application file for complete search history.

(56) References Cited

U.S. PATENT DOCUMENTS

| | | | | |
|---|---|---|---|---|
| 5,666,916 | A | * 9/1997 | Fujieda | ........... F01L 1/267 |
| | | | | 123/295 |
| 5,778,859 | A | * 7/1998 | Takagi | ........ F02D 41/0032 |
| | | | | 123/520 |

(Continued)

FOREIGN PATENT DOCUMENTS

| | | |
|---|---|---|
| EP | 0856655 A2 | 8/1998 |
| EP | 0943793 A2 | 9/1999 |

(Continued)

*Primary Examiner* — David Hamaoui
(74) *Attorney, Agent, or Firm* — Birch, Stewart, Kolasch & Birch, LLP

(57) ABSTRACT

A fuel injection control apparatus of an internal combustion engine, which can appropriately control the amount of fuel injection from an in-cylinder injection valve so as to achieve a desired air-fuel ratio, regardless of the operating state of the internal combustion engine, is provided. The fuel injection control apparatus comprises: an additional injection means which, when determining that the operating state of the internal combustion engine is a transient state, allows the in-cylinder injection valve to inject a fuel amount conformed to a changing intake air amount; and a subtraction means for subtracting a minimum fuel amount, injectable from the in-cylinder injection valve, from a fuel amount to be injected, before injection by the additional injection means is performed.

20 Claims, 5 Drawing Sheets

(56) References Cited

U.S. PATENT DOCUMENTS

| | | | | |
|---|---|---|---|---|
| 5,979,397 | A * | 11/1999 | Machida | F02D 41/3023 123/295 |
| 6,044,642 | A * | 4/2000 | Nishimura | F02D 41/024 123/295 |
| 6,178,943 | B1 * | 1/2001 | Taga | F02D 37/02 123/295 |
| 6,192,863 | B1 * | 2/2001 | Takase | F02D 41/3809 123/357 |
| 6,340,014 | B1 * | 1/2002 | Tomita | F02D 41/024 123/295 |
| 7,234,447 | B2 * | 6/2007 | Okubo | F02D 41/0042 123/431 |
| 7,866,303 | B2 * | 1/2011 | Storhok | F02D 41/064 123/478 |
| 8,977,472 | B2 * | 3/2015 | Kita | F02D 41/32 701/104 |
| 9,121,364 | B2 * | 9/2015 | Fukuda | F02D 41/401 |
| 2014/0331973 | A1 * | 11/2014 | Matsuda | F02D 41/3094 123/478 |

FOREIGN PATENT DOCUMENTS

| | | | |
|---|---|---|---|
| JP | 2013-87755 | A | 5/2013 |
| JP | 2013209936 | A * | 10/2013 |
| JP | 2014-55544 | A | 3/2014 |
| JP | 2014-62553 | A | 4/2014 |

* cited by examiner

FUEL INJECTION CONTROL APPARATUS OF INTERNAL COMBUSTION ENGINE

The entire disclosure of Japanese Patent Application No. 2014-147124 filed on Jul. 17, 2014 is expressly incorporated by reference herein.

TECHNICAL FIELD

This invention relates to a fuel injection control apparatus of an internal combustion engine which is at least equipped with an in-cylinder injection valve for injecting fuel directly into a combustion chamber.

BACKGROUND ART

Among internal combustion engines (may hereinafter be referred to as "engines") loaded on vehicles, such as automobiles, is one equipped with an intake passage injection valve for injecting fuel into an intake passage, and an in-cylinder injection valve for injecting fuel directly into a combustion chamber. Fuel injections from the intake passage injection valve and the in-cylinder injection valve are controlled, as appropriate, by a fuel injection control apparatus installed in the engine.

The fuel injection control apparatus of the engine, for example, selectively performs injection by the intake passage injection valve and injection by the in-cylinder injection valve in accordance with the load region of the engine. Concretely, there is a fuel injection control apparatus designed to inject fuel only from the intake passage injection valve when the operating state of the engine is in a low rotation, low load operating region, and to inject fuel from each of the in-cylinder injection valve and the intake passage injection valve when the operating state of the engine is in a high rotation, high load operating region (see Patent Document 1).

PRIOR ART DOCUMENTS

Patent Documents

[Patent Document 1] JP-A-2014-62553

SUMMARY OF THE INVENTION

Problems to be Solved by the Invention

As mentioned above, the in-cylinder injection valve injects fuel directly into the combustion chamber. Depending on the timing of injection, therefore, there arises the necessity of making the pressure of fuel (fuel pressure), which is supplied to the in-cylinder injection valve, higher than the fuel pressure of the intake passage injection valve. For this purpose, the in-cylinder injection valve is supplied by a high pressure supply pump with fuel at a higher pressure than the pressure of fuel to be supplied to the intake passage injection valve. Thus, fuel can be directly injected into the combustion chamber not only in an intake stroke, but also in a compression stroke or the like.

Since the pressure of fuel to be supplied to the in-cylinder injection valve is high, however, it is difficult to inject a small amount of fuel from the in-cylinder injection valve with high accuracy, thus making the minimum injection amount of the in-cylinder injection valve relatively large. In detail, the minimum injection amount of the in-cylinder injection valve is determined by the pulse width of a signal applied (valve opening period). Even when the minimum pulse width is the same, however, the minimum injection amount increases as the pressure of fuel to be supplied to the in-cylinder injection valve rises.

Depending on the operating state of the engine, therefore, a situation is assumed in which the fuel amount of the in-cylinder injection valve computed from an intake air amount or the like is less than a fuel amount corresponding to the minimum injection amount of the in-cylinder injection valve. For example, if fuel is injected from the in-cylinder injection valve in an intake stroke, and then fuel is further injected additionally from the in-cylinder injection valve in a compression stroke, the amount of fuel to be injected is apt to become small. Thus, the amount of fuel to be injected additionally from the in-cylinder injection valve in the compression stroke tends to be less than the fuel amount corresponding to the minimum injection amount of the in-cylinder injection valve.

In a situation under which the amount of fuel to be injected from the in-cylinder injection valve is smaller than the fuel amount corresponding to the minimum injection amount, the problem is involved that it is difficult to appropriately control the amount of fuel injection from the in-cylinder injection valve so as to achieve a desired air-fuel ratio.

The present invention has been accomplished in the light of the above-described circumstances. It is an object of this invention to provide a fuel injection control apparatus of an internal combustion engine, which can appropriately control the amount of fuel injection from an in-cylinder injection valve so as to achieve a desired air-fuel ratio, regardless of the operating state of an internal combustion engine.

Means for Solving the Problems

A first aspect of the present invention for solving the above problems is a fuel injection control apparatus of an internal combustion engine having an in-cylinder injection valve for directly injecting fuel into a combustion chamber, comprising: an operating state detection means for detecting the operating state of the internal combustion engine; an additional injection means which, when determining based on the detection results of the operating state detection means that the operating state of the internal combustion engine is a transient state involving a change in an intake air amount, allows the in-cylinder injection valve to inject a fuel amount conformed to the changing intake air amount; and a subtraction means for subtracting a minimum fuel amount, injectable from the in-cylinder injection valve, from a fuel amount to be injected, before injection by the additional injection means is performed.

A second aspect of the present invention is the fuel injection control apparatus of an internal combustion engine according to the first aspect, wherein the additional injection means allows the in-cylinder injection valve to inject a fuel amount obtained by adding the minimum fuel amount to the fuel amount conformed to the intake air amount.

A third aspect of the present invention is the fuel injection control apparatus of an internal combustion engine according to the first or second aspect, wherein if a fuel amount obtained by subtracting the minimum fuel amount from the fuel amount to be injected, before the injection by the additional injection means is performed, is less than the minimum fuel amount, the subtraction means takes the fuel amount obtained by subtraction as the minimum fuel amount.

A fourth aspect of the present invention is the fuel injection control apparatus of an internal combustion engine according to the third aspect, wherein if the subtraction means takes the fuel amount obtained by the subtraction as the minimum fuel amount, the additional injection means allows the in-cylinder injection valve to inject a fuel amount obtained by adding the fuel amount to be injected, before the injection by the additional injection means is performed, to the fuel amount conformed to the intake air amount.

A fifth aspect of the present invention is the fuel injection control apparatus of an internal combustion engine according to any one of the first to fourth aspects, wherein the additional injection means allows the in-cylinder injection valve to inject fuel in a compression stroke.

A sixth aspect of the present invention is the fuel injection control apparatus of an internal combustion engine according to any one of the first to fifth aspects, wherein the subtraction means subtracts the minimum fuel amount from the fuel amount to be injected, before the injection by the additional injection means is performed, when the operating state of the internal combustion engine is a gentle acceleration state.

Effects of the Invention

According to the present invention, even when the fuel amount, which is computed from the intake air amount or the like and which is to be injected additionally from the in-cylinder injection valve, is less than the fuel amount corresponding to the minimum injection amount of the in-cylinder injection valve, the fuel amount to be injected from the in-cylinder injection valve can be controlled appropriately so that a desired air-fuel ratio is obtained. Thus, the air-fuel ratio of the internal combustion engine can be appropriately controlled, regardless of the operating state of the internal combustion engine.

MODE FOR CARRYING OUT THE INVENTION

An embodiment of the present invention will now be described in detail with reference to the accompanying drawings.

Figure 1:
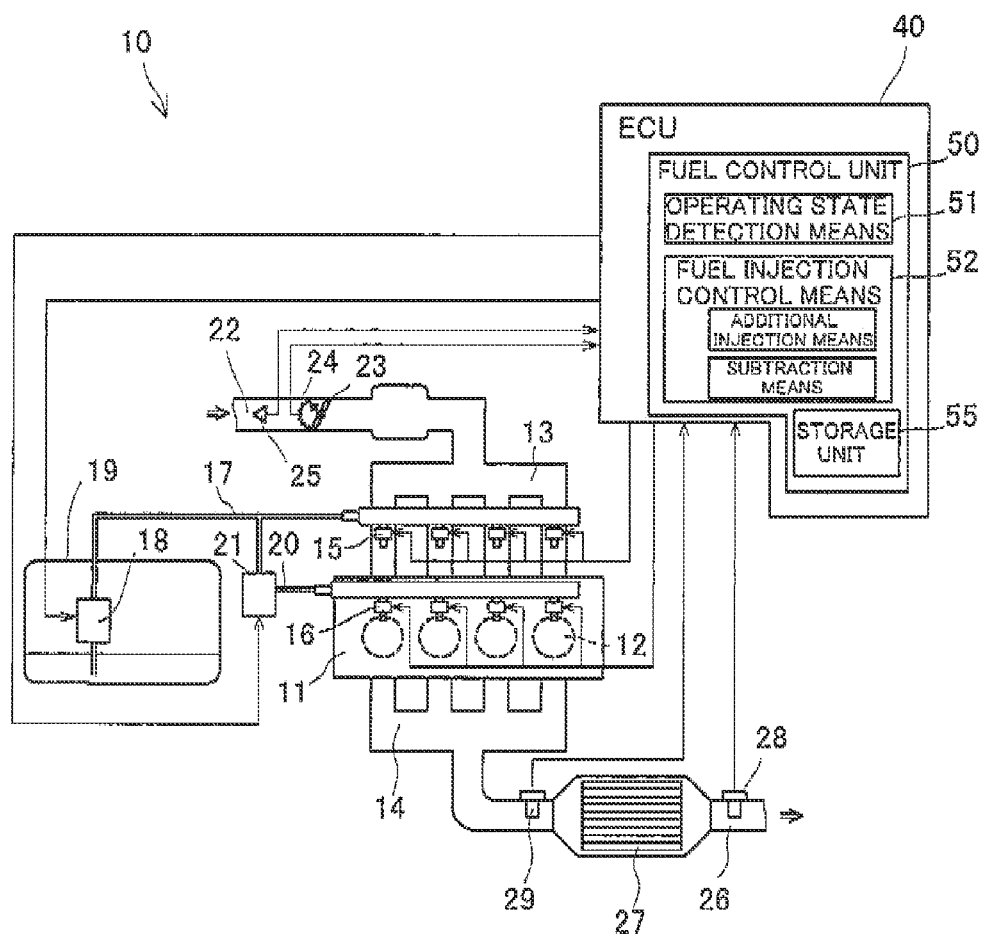
FIG. 1 is a schematic view showing the entire configuration of an engine according to an embodiment of the present invention.

First of all, an explanation will be offered for the entire configuration of an engine 10 according to the embodiment of the present invention. FIG. 1 is a view showing the schematic configuration of the engine according to the present invention.

The engine 10 shown in FIG. 1 is a manifold fuel injection (multi-point injection) multi-cylinder engine, for example, an in-line 4-cylinder 4-stroke engine, and has four cylinders 12 installed in parallel in an engine body 11. In each cylinder (combustion chamber) 12, a spark plug is arranged, and an intake port and an exhaust port are provided, although they are not shown. The engine body 11 is equipped with an intake manifold 13 connected to the intake ports, and an exhaust manifold 14 connected to the exhaust ports.

The engine body 11 is also provided with intake passage injection valves 15 for injecting fuel into an intake passage, for example, near the intake port, of the engine 10, and in-cylinder injection valves 16 for directly injecting fuel into each cylinder (combustion chamber) of the engine 10.

The intake passage injection valve 15 is connected to a low pressure supply pump 18 via a low pressure delivery pipe 17. The low pressure supply pump 18 is disposed, for example, within a fuel tank 19. Fuel within the fuel tank 19 is supplied to the low pressure delivery pipe 17 by the low pressure supply pump 18, and supplied to the intake passage injection valve 15 via the low pressure delivery pipe 17.

The in-cylinder injection valve 16 is connected to a high pressure supply pump 21 via a high pressure delivery pipe 20. The high pressure supply pump 21 is connected to the low pressure supply pump 18 via the low pressure delivery pipe 17. That is, the low pressure delivery pipe 17 led out from the fuel tank 19 is divided into two branches, one of the branches being connected to the intake passage injection valves 15, and the other branch being connected to the high pressure supply pump 21. The fuel within the fuel tank 19 is supplied to the intake passage injection valve 15 and, at the same time, to the high pressure supply pump 21, by the low pressure supply pump 18 via the low pressure delivery pipe 17 as mentioned above.

The high pressure supply pump 21 is adapted to be capable of supplying the fuel, which has been supplied via the low pressure delivery pipe 17, to the high pressure delivery pipe 20 at a higher pressure. That is, the high pressure supply pump 21 is adapted to be capable of supplying fuel to the in-cylinder injection valve 16 at a higher fuel pressure than the pressure of fuel to be supplied to the intake passage injection valve 15 (fuel pressure of the intake passage injection valve 15).

As the low pressure supply pump 18 and the high pressure supply pump 21, existing pumps may be adopted, and their configurations are not restricted.

An intake pipe (intake passage) 22 connected to the intake manifold 13 is provided with a throttle valve 23, and also has a throttle position sensor (TPS) 24 for detecting the valve opening of the throttle valve 23. Further, an air flow sensor 25 for detecting the amount of intake air is provided upstream of the throttle valve 23. In an exhaust pipe (exhaust passage) 26 connected to the exhaust manifold 14, a three-way catalyst 27, a catalyst for exhaust purification, is interposed. An $O_2$ sensor 28 for detecting the $O_2$ concentration of an exhaust gas after passage through the catalyst is provided on the outlet side of the three-way catalyst 27. A linear air-fuel ratio sensor (LAFS) 29 for detecting the air-fuel ratio of an exhaust gas (exhaust air-fuel ratio) before passage through the catalyst is provided on the inlet side of the three-way catalyst 27.

The engine 10 also has an electronic control unit (ECU) 40, and the ECU 40 includes an input-output device, a storage device for storing a control program, a control map, etc., a central processing unit, timers, and counters. Based on information from various sensors, the ECU 40 exercises the integrated control of the engine 10. To the ECU 40, various sensors, including the above-mentioned throttle position sensor (TPS) 24, air flow sensor 25, $O_2$ sensor 28, and LAFS 29 as well as a crank angle sensor, are connected. The ECU 40 exercises various types of control based on detection information from these sensors.

The fuel injection control apparatus of an internal combustion engine according to the present invention is constituted by the above-described ECU and, as will be described below, controls, as appropriate, the amounts of fuel injected from the intake passage injection valve 15 and the in-cylinder injection valve 16 in accordance with the operating state of the engine 10.

The ECU 40 has a fuel control unit 50 as a fuel injection control apparatus of an internal combustion engine, and the fuel control unit 50 has an operating state detection means (device) 51 and a fuel injection control means (device) 52.

The operating state detection means 51 detects the operating state of the engine 10 based on information from the above-mentioned various sensors, for example, changes in the load and rotation number (rotational speed) of the engine 10. In the present embodiment, for example, the operating state detection means 51 determines whether the operating state of the engine 10 is a steady state or a predetermined transient state. For example, on condition that the amount of a change in the intake air amount is a first threshold value or more, the operating state detection means 51 determines that the operating state of the engine is a transient state. The operating state detection means 51, moreover, refers to a predetermined operating region map or the like (see FIG. 2), determining which operating region the operating state of the engine 10 is in.

Figure 2:
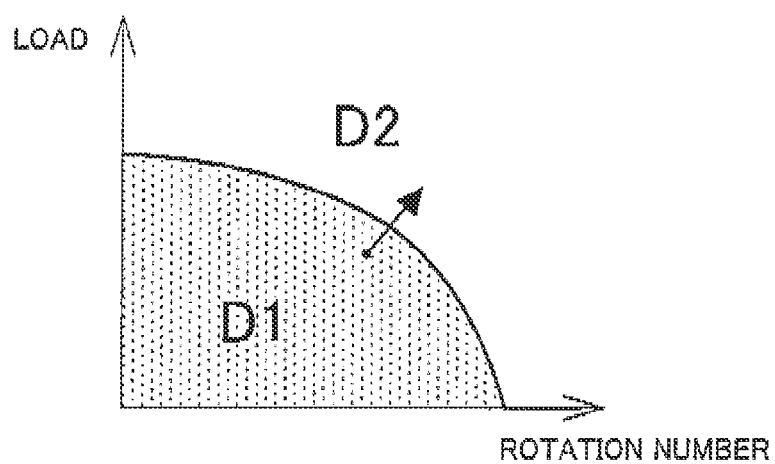
FIG. 2 is a view showing an example of a map defining the operating regions of the engine.

The operating region map is preset based on the rotation number (rotational speed) and load of the engine 10, for example, as shown in FIG. 2. In this example, the operating state of the engine 10 is set in two forms, a first operating region D1 which is an operating region on a low rotation low load side, and a second operating region D2 which is an operating region on a high rotation high load side as compared with the first operating region D1.

The fuel injection control means 52 selects a fuel injection mode in accordance with the operating state of the engine 10, namely, the detection results of the operating state detection means 51, to control, as appropriate, the amounts of fuel to be injected from the intake passage injection valve 15 and the in-cylinder injection valve 16. In the present embodiment, for example, when the operating state of the engine 10 is a steady state, the fuel injection control means 52 functions as follows: If the operating state of the engine 10 is in the first operating region D1, the fuel injection control means 52 selects and executes the mode of injecting fuel only from the intake passage injection valves 15 (hereinafter referred to as "MPI injection mode"). If the operating state of the engine 10 is in the second operating region D2, the fuel injection control means 52 selects and executes the mode of injecting fuel from the intake passage injection valves 15 and the in-cylinder injection valves 16 at a predetermined injection amount ratio (hereinafter referred to as "MPI+DI injection mode").

In the "MPI+DI injection mode", the injection amount ratio between the intake passage injection valve 15 and the in-cylinder injection valve 16 is preset and, with the present embodiment, the injection amount ratio between the intake passage injection valve 15 and the in-cylinder injection valve 16 has been set, in principle, at a constant value. If the operating state of the engine 10 is a steady state, changes in the fuel amount required for one combustion cycle (required fuel amount) are minimal. Thus, the injection amount of the intake passage injection valve 15 and the injection amount of the in-cylinder injection valve 16 are at the above ratio.

If the operating state of the engine 10 is a transient state, on the other hand, the required fuel amount changes (increases), as appropriate, in accordance with a change in the operating state of the engine 10. For example, when the operating state of the engine 10 shifts from the first operating region D1 to the second operating region D2, too, as indicated by an arrow in FIG. 2, the required fuel amount changes (increases), as appropriate. In response to this change in the operating state of the engine 10, therefore, the fuel injection control means 52 switches the fuel injection mode from the "MPI injection mode" to the "MPI+DI injection mode". Also, the fuel injection control means 52 as an additional injection means allows the in-cylinder injection valve 16 to perform additional injection at a predetermined timing, thereby adjusting, as appropriate, the amount of fuel injected from the in-cylinder injection valve 16. That is, when the operating state of the engine 10 is a transient state, the fuel injection control means 52 executes additional injection for allowing the in-cylinder injection valve 16 to inject an additional fuel amount conformed to an intake air amount changed by the transient state. In this case, the injection amount of the intake passage injection valve 15 and the injection amount of the in-cylinder injection valve 16 may slightly deviate from the above ratio.

The timings of fuel injections from the intake passage injection valve 15 and the in-cylinder injection valve 16 in the "MPI+DI injection mode" are set in a plurality of injection patterns, and the fuel injection control means 52 selects a suitable pattern from among them in accordance with the operating state of the engine 10. An example of the injection patterns for fuel from the intake passage injection valve 15 and the in-cylinder injection valve 16 will be described by reference to FIGS. 3A, 3B and FIG. 4.

Figure 3A:
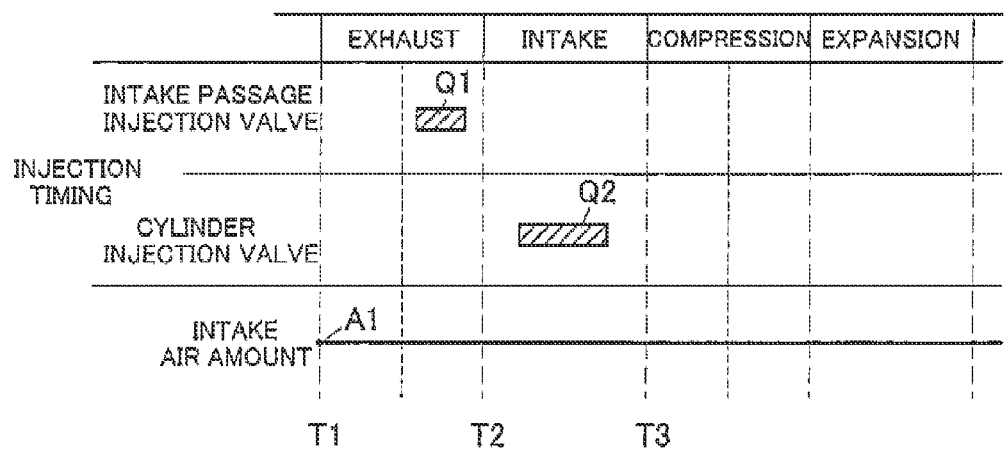
FIGS. 3A, 3B are views illustrating an example of fuel injection patterns and methods for computing fuel injection amounts.
Figure 3B:
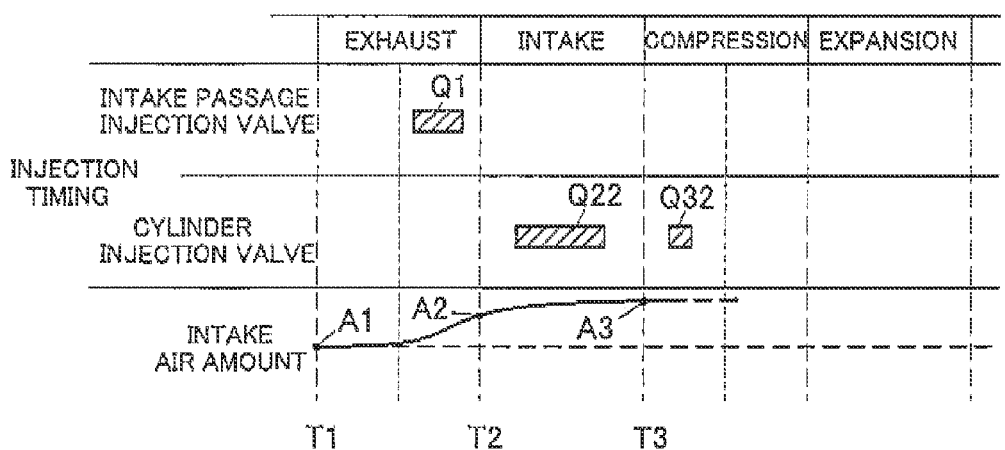

In the example shown in FIGS. 3A, 3B, the timing of fuel injection from the intake passage injection valve 15 (timing of valve opening) is set at an exhaust stroke. The timing of fuel injection from the in-cylinder injection valve 16 is set at an intake stroke, as shown in FIG. 3A, if the operating state of the engine 10 is a steady state. If the operating state of the engine 10 is a transient state, on the other hand, for example, if the operating state of the engine 10 shifts from the first operating region D1 to the second operating region D2, the timing of fuel injection from the in-cylinder injection valve 16 is set at an intake stroke and a first half of a compression stroke, as shown in FIG. 3B. That is, additional injection from the in-cylinder injection valve 16 is executed in the first half of the compression stroke.

Further, the fuel injection control means 52 computes the valve-opening periods (pulse widths) of the intake passage injection valve 15 and the in-cylinder injection valve 16 based on the operating state of the engine 10, for example, from the amount of intake air, before each stroke. Since the engine 10 according to the present embodiment is a 4-cylinder 4-stroke engine, a phase difference of 180 degrees in the crank angle in each cylinder coincides with the period of each stroke (exhaust stroke, intake stroke, compression stroke, expansion stroke) of the combustion cycle. In the present embodiment, therefore, the fuel injection control means 52 computes the fuel injection amount in each stroke based on the amount of intake air immediately before each stroke.

Figure 4:
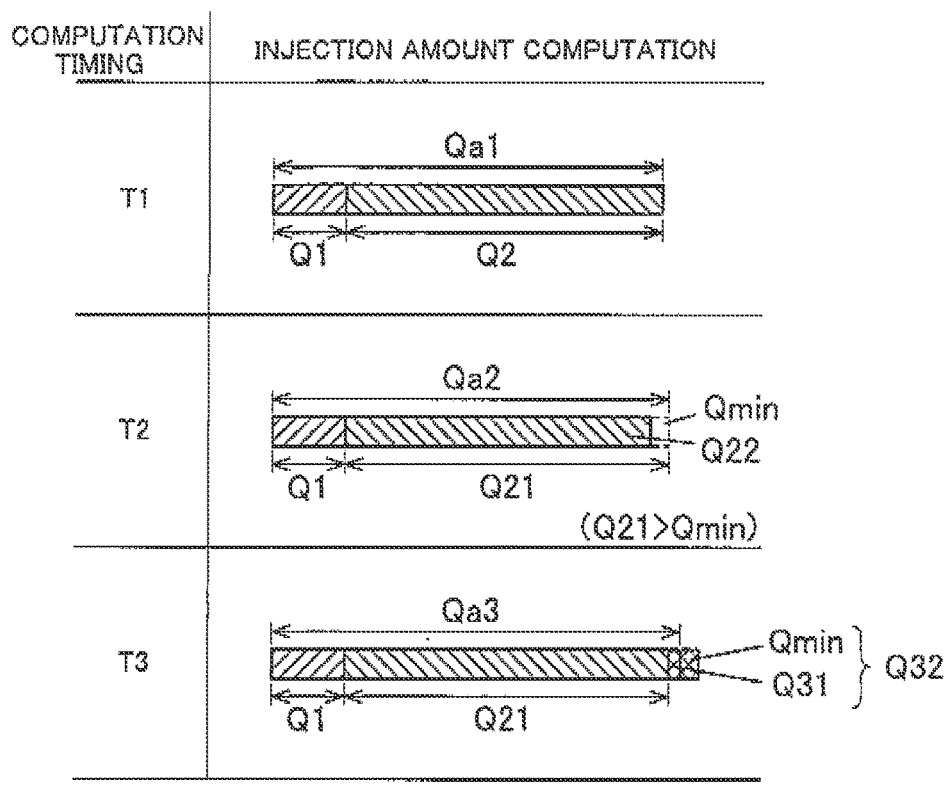
FIG. 4 is a view illustrating an example of computing fuel amounts under fuel injection control according to the present invention.

In the present embodiment, a fuel amount Q1 to be injected from the intake passage injection valve 15 and a fuel amount Q2 to be injected from the in-cylinder injection valve 16 are computed based on an intake air amount A1 at a timing T1 immediately before the exhaust stroke. Concretely, as shown in FIGS. 3A, 3B and 4, a first task is to compute a required fuel amount Qa1 from the intake air amount A1 at the timing T1. The required fuel amount refers to the amount of fuel necessary for one combustion cycle (the sum of the injection amount of the intake passage injection valve 15 and the injection amount of the in-cylinder injection valve 16).

The fuel amount Q1 to be injected from the intake passage injection valve 15 and the fuel amount Q2 to be injected from the in-cylinder injection valve 16 are computed based on the required fuel amount Qa1 and the aforementioned injection amount ratio between the intake passage injection valve 15 and the in-cylinder injection valve 16. Concretely, if the injection amount ratio between the intake passage injection valve 15 and the in-cylinder injection valve 16 is A:B, the fuel amount Q1 to be injected from the intake passage injection valve 15 is calculated from the required fuel amount Qa1×A/(A+B), while the fuel amount Q2 to be injected from the in-cylinder injection valve 16 is calculated from the required fuel amount Qa1×B/(A+B). The fuel injection control means 52 opens the intake passage injection valve 15 for a predetermined valve-opening period so that the fuel amount Q1 is achieved in the exhaust stroke. If the operating state of the engine 10 is a steady state, the intake air amount A1 during the exhaust stroke remains substantially unchanged. In the intake stroke, therefore, the fuel injection control means 52 opens the in-cylinder injection valve 16 for a predetermined valve-opening period so that the fuel amount Q2 computed at the timing T1 is obtained (see FIG. 3A).

If the operating state of the engine 10 is a transient state, for example, if the operating state of the engine 10 shifts from the first operating region D1 to the second operating region D2, a required fuel amount Qa2 is computed based on an intake air amount A2 at a timing T2 immediately before the intake stroke. When the operating state of the engine 10 is a transient state, the intake air amount increases beyond a predetermined amount (first threshold value) during the exhaust stroke. Thus, the required fuel amount Qa2 is computed again based on the intake air amount A2 at the timing T2 immediately before the intake stroke, whereby an increase in the required fuel amount during the exhaust stroke is corrected. The fuel amount Q1 injected from the intake passage injection valve 15 in the exhaust stroke is subtracted from the required fuel amount Qa2 to obtain a fuel amount (first fuel amount) Q21 to be injected from the in-cylinder injection valve 16 in the intake stroke.

In the present embodiment, moreover, the fuel injection control means 52 as a subtraction means subtracts from the fuel amount Q21 a fuel amount Qmin corresponding to the minimum injection amount of the in-cylinder injection valve 16 (Qmin is a minimum amount of fuel injectable from the in-cylinder injection valve 16), thereby obtaining a fuel amount (second fuel amount) Q22 to be injected in the intake stroke (see FIG. 4). That is, the fuel injection control means 52 as the subtraction means subtracts the fuel amount Qmin corresponding to the minimum injection amount of the in-cylinder injection valve 16 from the fuel amount to be injected, before additional injection. In the present embodiment, the fuel amount Qmin is subtracted from the fuel amount Q21 to be injected from the in-cylinder injection valve 16 in the intake stroke. The fuel injection control means 52 opens the in-cylinder injection valve 16 for a predetermined valve-opening period so that the fuel amount Q22 is achieved in the intake stroke (see FIG. 3B). The fuel amount Qmin corresponding to the minimum injection amount of the in-cylinder injection valve 16 is stored, for example, in a storage unit 55 provided in the fuel control unit 50.

Then, a required fuel amount Qa3 is computed based on an intake air amount A3 at a timing T3 immediately before the compression stroke. The fuel amount Q1 injected in the exhaust stroke and the fuel amount Q21 obtained by computation at the timing T2 are subtracted from the required fuel amount Qa3 to obtain a fuel amount (third fuel amount) Q31 to be additionally injected in a first half of the compression stroke.

If the operating state of the engine 10 is a transient state, the intake air amount A3 at the timing T3 immediately after the intake stroke (immediately before the compression stroke) may also change greatly from the intake air amount A2 at the timing T2. Thus, the required fuel amount Qa3 is computed again based on the intake air amount A3, whereby an increase in the required fuel amount during the intake stroke is corrected.

Further, the fuel injection control means 52 as an additional injection means adds to the fuel amount Q31 the fuel amount Qmin corresponding to the minimum injection amount of the in-cylinder injection valve 16, thereby obtaining a fuel amount (fourth fuel amount) 032 to be injected in the first half of the compression stroke. The fuel injection control means 52 opens the in-cylinder injection valve 16 for a predetermined valve-opening period so that this additional fuel amount Q32 is injected in the first half of the compression stroke (see FIG. 3B).

As noted above, when the operating state of the engine 10 is a transient state, fuel is injected from the in-cylinder injection valve 16 in the intake stroke and the first half of the compression stroke, whereby increases in the required fuel amount in the exhaust stroke and the intake stroke associated with changes in the intake air amount can be supplemented. Furthermore, the fuel amount Qmin corresponding to the minimum injection amount is subtracted from the fuel amount Q21 to be injected in the intake stroke, and the fuel amount Qmin is added to the fuel amount Q31 to be injected in the first half of the compression stroke. Because of this procedure, even if the fuel amount Q31 to be injected in the first half of the compression stroke is less than the fuel amount Qmin corresponding to the minimum injection amount, the fuel amount Q32 which is actually injected is not less than the fuel amount Qmin corresponding to the minimum injection amount. Hence, appropriate fuel amounts can be injected from the in-cylinder injection valve 16 in the intake stroke and the first half of the compression stroke. Eventually, the air-fuel ratio of the engine 10 can be controlled appropriately.

Figure 5:
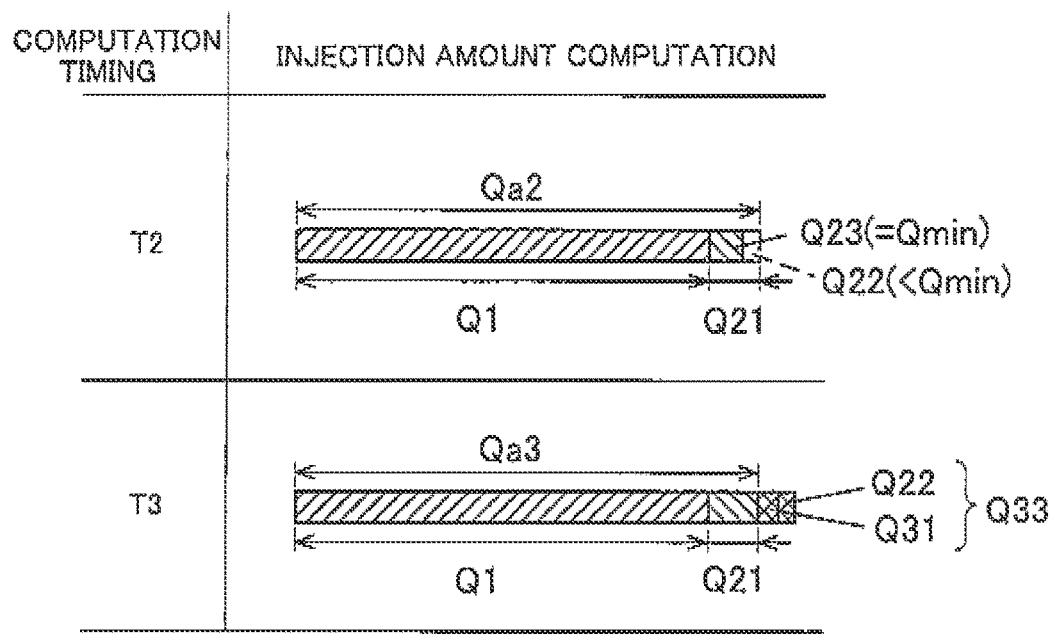
FIG. 5 is a view illustrating another example of computing fuel amounts under fuel injection control according to the present invention.

Depending on the operating state of the engine 10 or the like, for example, the fuel amount Q22 found at the timing T2 may be smaller than the fuel amount Qmin corresponding to the minimum injection amount of the in-cylinder injection valve 16, as shown in FIG. 5. In this case, the fuel injection control means 52 as the subtraction means subtracts the fuel amount Q22 from the fuel amount Q21 to obtain a fuel amount Q23 which is actually injected from the in-cylinder injection valve 16. This fuel amount Q23 becomes the fuel amount Qmin corresponding to the minimum injection amount. That is, the lower limit value of the fuel amount to be injected from the in-cylinder injection valve 16 in the intake stroke is clipped with the fuel amount Qmin corresponding to the minimum injection amount. The fuel injection control means 52 opens the in-cylinder injection valve 16 for a predetermined valve-opening period so that the fuel amount Q23 is injected, that is, the fuel amount Qmin corresponding to the minimum injection amount is injected, from the in-cylinder injection valve 16 in the intake stroke.

Then, the fuel injection control means 52 as the additional injection means adds the fuel amount (second fuel amount) Q22, computed at the timing T2, to the additional fuel amount (third fuel amount) Q31, obtained by computation at the timing T3, thereby finding an additional fuel amount (fifth fuel amount) Q33 to be additionally injected in the first half of the compression stroke. The fuel injection control means 52 opens the in-cylinder injection valve 16 for a predetermined valve-opening period so that this additional fuel amount Q33 is injected from the in-cylinder injection valve 16 in the first half of the compression stroke.

By so further adjusting the fuel amount to be injected from the in-cylinder injection valve 16 in the intake stroke, the fuel amount which is injected from the in-cylinder injection valve 16 in the intake stroke can be controlled reliably with high accuracy. Moreover, the fuel amount being injected from the in-cylinder injection valve 16 in the first half of the compression stroke also becomes nearly equal to or more than a fuel amount corresponding to the minimum injection amount, so that the fuel amount which is injected from the in-cylinder injection valve 16 in the first half of the compression stroke can also be controlled highly accurately.

In the present embodiment, if it is determined that the operating state of the engine 10 is a predetermined transient state, the fuel injection control means 52 as the additional injection means performs a subtraction processing for subtracting the minimum fuel amount, which is injectable from the in-cylinder injection valve 16, from the fuel amount to be injected in additional injection before the additional injection is carried out. This subtraction processing is preferably performed when the operating state of the engine 10 is a gentle acceleration state.

In the above example, if the amount of a change in the intake air amount is the first threshold value or higher, it is determined that the operating state of the engine is a transient state.

Further preferably, if the amount of a change in the intake air amount is the second threshold value (<first threshold value) or lower, for example, it is determined that the operating state of the engine 10 is a gentle acceleration state, and the above subtraction processing is performed. That is, it is preferred for the fuel injection control means 52 to perform the above-mentioned subtraction processing, on condition that the operating state of the engine 10 is a gentle acceleration state with minimal changes in the rotation number and load.

When the operating state of the engine 10 is a gentle acceleration state, the fuel amount injected from the in-cylinder injection valve 16 in the first half of the compression stroke tends to be small. That is, the fuel amount injected from the in-cylinder injection valve 16 in the first half of the compression stroke tends to be smaller than the minimum fuel amount injectable from the in-cylinder injection valve 16. When the operating state of the engine 10 is a gentle acceleration state, therefore, the above-mentioned subtraction processing is particularly effective.

One embodiment of the present invention has been described above, but the present invention is in no way limited to this embodiment.

In the above-described embodiment, for example, the four-cylinder engine is illustrated to describe the present invention. However, the fuel injection control apparatus of the present invention can be adopted, for example, in a 3-cylinder or 6-cylinder engine. It is necessary to set the timing of computation of the fuel injection amount, as appropriate, in accordance with the number of the cylinders. No matter what the number of the cylinders is, the fuel injection amount can be controlled highly accurately, regardless of the operating state of the engine, as stated above.

In the above embodiment, moreover, the internal combustion engine equipped with the intake passage injection valve and the in-cylinder injection valve is illustrated to describe the present invention. However, the present invention can be applied to an internal combustion engine having at least an in-cylinder injection valve.

EXPLANATIONS OF LETTERS OR NUMERALS

10 Engine (internal combustion engine)
11 Engine body
12 Cylinder (combustion chamber)
13 Intake manifold
14 Exhaust manifold
15 Intake passage injection valve
16 In-cylinder injection valve
17 Low pressure delivery pipe
18 Low pressure supply pump
19 Fuel tank
20 High pressure delivery pipe
21 High pressure supply pump
22 Intake pipe (intake passage)
23 Throttle valve
24 Throttle position sensor (TPS)
25 Air flow sensor
26 Exhaust pipe (exhaust passage)
27 Three-way catalyst
28 $O_2$ sensor
29 Linear air-fuel ratio sensor (LAFS)
40 ECU

The invention claimed is:

1. A fuel injection control apparatus of an internal combustion engine having an in-cylinder injection valve for directly injecting fuel into a combustion chamber, comprising:
an operating state detection device that detects an operating state of the internal combustion engine;
an additional injection device that, when determining based on detection results of the operating state detection device that the operating state of the internal combustion engine is a transient state involving a change in an intake air amount, controls the in-cylinder injection valve to inject a fuel amount conformed to the changing intake air amount; and
a subtraction device that subtracts a minimum fuel amount, injectable from the in-cylinder injection valve, from a fuel amount to be injected, before injection by the additional injection device is performed, wherein
in a steady state, the additional injection device calculates a first fuel amount to be injected from the in-cylinder injection valve during an intake stroke based on the operating state of the internal combustion engine at a first timing immediately before an exhaust stroke,
in a first transient state, the additional injection device calculates a second fuel amount, which includes a third fuel amount to be injected from the in-cylinder injection valve during the intake stroke based on the operating state of the internal combustion engine, at a second timing immediately before the intake stroke, and the subtraction device always subtracts the minimum fuel amount from the second fuel amount to obtain the third fuel amount, which is substituted for the first fuel amount, to be injected from the in-cylinder injection valve during the intake stroke, and in a second transient state, the additional injection device calculates a fifth fuel amount, which is an additional fuel amount to be injected in a compression stroke that immediately follows the intake stroke, based on the minimum fuel amount and a fourth fuel amount obtained from the operating state of the internal combustion engine at a third timing immediately before the compression stroke to inject a total of the fourth fuel amount and the minimum fuel amount during a first half of the compression stroke, such that at least the minimum fuel amount is injected in the compression stroke.

2. The fuel injection control apparatus of an internal combustion engine according to claim 1, wherein
the additional injection device controls the in-cylinder injection valve to inject the fifth fuel amount obtained by adding the minimum fuel amount to the fourth fuel amount.

3. The fuel injection control apparatus of an internal combustion engine according to claim 1, wherein
if the third fuel amount obtained by subtracting the minimum fuel amount from the second fuel amount, before the injection by the additional injection device is performed, is less than the minimum fuel amount, the subtraction device substitutes the minimum fuel amount for the third fuel amount.

4. The fuel injection control apparatus of an internal combustion engine according to claim 2, wherein
if the third fuel amount obtained by subtracting the minimum fuel amount from the second fuel amount, before the injection by the additional injection device is performed, is less than the minimum fuel amount, the subtraction device substitutes the minimum fuel amount for the third fuel amount.

5. The fuel injection control apparatus of an internal combustion engine according to claim 3, wherein
if the subtraction device takes the third fuel amount obtained by the subtraction as the substitute for the minimum fuel amount, the additional injection device controls the in-cylinder injection valve to inject a fifth fuel amount obtained by adding the fourth fuel amount obtained by the subtraction, before the injection by the additional injection device is performed, to the third fuel amount conformed to the changing intake air amount.

6. The fuel injection control apparatus of an internal combustion engine according to claim 4, wherein
if the subtraction device takes the third fuel amount obtained by the subtraction as the substitute for the minimum fuel amount, the additional injection device controls the in-cylinder injection valve to inject a fuel amount obtained by adding the fourth fuel amount obtained by the subtraction, before the injection by the additional injection device is performed, to the third fuel amount conformed to the intake air amount.

7. The fuel injection control apparatus of an internal combustion engine according to claim 1, wherein
the additional injection device controls the in-cylinder injection valve to inject fuel in a compression stroke.

8. The fuel injection control apparatus of an internal combustion engine according to claim 2, wherein
the additional injection device controls the in-cylinder injection valve to inject fuel in a compression stroke.

9. The fuel injection control apparatus of an internal combustion engine according to claim 3, wherein
the additional injection device controls the in-cylinder injection valve to inject fuel in a compression stroke.

10. The fuel injection control apparatus of an internal combustion engine according to claim 4, wherein
the additional injection device controls the in-cylinder injection valve to inject fuel in a compression stroke.

11. The fuel injection control apparatus of an internal combustion engine according to claim 5, wherein
the additional injection device controls the in-cylinder injection valve to inject fuel in a compression stroke.

12. The fuel injection control apparatus of an internal combustion engine according to claim 6, wherein
the additional injection device controls the in-cylinder injection valve to inject fuel in a compression stroke.

13. The fuel injection control apparatus of an internal combustion engine according to claim 1, wherein
the subtraction device subtracts the minimum fuel amount from the second fuel amount, before the injection by the additional injection device is performed, when the operating state of the internal combustion engine is a gentle acceleration state.

14. The fuel injection control apparatus of an internal combustion engine according to claim 2, wherein
the subtraction device subtracts the minimum fuel amount from the second fuel amount, before the injection by the additional injection device is performed, when the operating state of the internal combustion engine is a gentle acceleration state.

15. The fuel injection control apparatus of an internal combustion engine according to claim 3, wherein
the subtraction device subtracts the minimum fuel amount from the second fuel amount, before the injection by the additional injection device is performed, when the operating state of the internal combustion engine is a gentle acceleration state.

16. The fuel injection control apparatus of an internal combustion engine according to claim 4, wherein
the subtraction device subtracts the minimum fuel amount from the second fuel amount, before the injection by the additional injection device is performed, when the operating state of the internal combustion engine is a gentle acceleration state.

17. The fuel injection control apparatus of an internal combustion engine according to claim 5, wherein
the subtraction device subtracts the minimum fuel amount from the second fuel amount, before the injection by the additional injection device is performed, when the operating state of the internal combustion engine is a gentle acceleration state.

18. The fuel injection control apparatus of an internal combustion engine according to claim 6, wherein
the subtraction device subtracts the minimum fuel amount from the second fuel amount, before the injection by the additional injection device is performed, when the operating state of the internal combustion engine is a gentle acceleration state.

19. The fuel injection control apparatus of an internal combustion engine according to claim 7, wherein
the subtraction device subtracts the minimum fuel amount from the second fuel amount, before the injection by the additional injection device is performed, when the operating state of the internal combustion engine is a gentle acceleration state.

20. The fuel injection control apparatus of an internal combustion engine according to claim 8, wherein the subtraction device subtracts the minimum fuel amount from the second fuel amount, before the injection by the additional injection device is performed, when the operating state of the internal combustion engine is a gentle acceleration state.

* * * * *